United States Patent
Planchard (10) Patent No.: US 9,956,741 B2
(45) Date of Patent: May 1, 2018

(54) MULTILAYER ARTICLE COMPRISING A BIODEGRADABLE POLYMER-BASED LAYER AND A CELLULOSE-FIBER BASED SUPPORT; METHOD OF MANUFACTURING MULTILAYER ARTICLE AND FOOD ACCESSORY COMPRISING A MULTILAYER ARTICLE

(71) Applicant: AHLSTROM-MUNKSJÖ OYJ, Helsinki (FI)

(72) Inventor: Hervé Planchard, Marcq en Baroeul (FR)

(73) Assignee: AHLSTROM-MUNKSJÖ OYJ, Helsinki (FI)

( * ) Notice: Subject to any disclaimer, the term of this patent is extended or adjusted under 35 U.S.C. 154(b) by 0 days. days.

(21) Appl. No.: 14/404,815

(22) PCT Filed: May 7, 2013

(86) PCT No.: PCT/FI2013/050501
§ 371 (c)(1),
(2) Date: Dec. 1, 2014

(87) PCT Pub. No.: WO2013/178870
PCT Pub. Date: Dec. 5, 2013

(65) Prior Publication Data
US 2015/0151508 A1 Jun. 4, 2015

(30) Foreign Application Priority Data
May 31, 2012 (FR) ...................... 12 55034

(51) Int. Cl.
*B32B 5/02* (2006.01)
*B32B 7/12* (2006.01)
(Continued)

(52) U.S. Cl.
CPC .............. *B32B 5/022* (2013.01); *A21B 3/131* (2013.01); *B29C 53/04* (2013.01); *B29C 65/02* (2013.01);
(Continued)

(58) Field of Classification Search
CPC ....... A21B 3/13; A21B 3/131; Y10T 442/637; Y10T 442/693; B32B 2307/7163; B32B 2439/70
(Continued)

(56) References Cited

U.S. PATENT DOCUMENTS 1,633,787 A * 6/1927 Kress ................. D21H 27/32
  156/224
5,203,491 A * 4/1993 Marx ................. A21B 3/131
  220/573.1
(Continued)

FOREIGN PATENT DOCUMENTS

JP  2002-191283  7/2002
JP  2002-249913  9/2002
(Continued)

OTHER PUBLICATIONS

International Search Report for PCT/FI2013/050501, dated Sep. 25, 2013.
(Continued)

*Primary Examiner* — Peter Y Choi
(74) *Attorney, Agent, or Firm* — Nixon & Vanderhye P.C.

(57) ABSTRACT

Invention relates to a multilayer article comprising successively: a non-woven layer of fibers (3) comprising at least 50% by weight of at least one biodegradable polymer melting point of which is below 220° C.; a layer of food-safe adhesive (2); a cellulose-fiber based support (1).

33 Claims, 3 Drawing Sheets

(51) Int. Cl.

| | |
|---|---|
| *B32B 27/10* | (2006.01) |
| *B32B 27/36* | (2006.01) |
| *B32B 29/00* | (2006.01) |
| *B32B 29/02* | (2006.01) |
| *A21B 3/13* | (2006.01) |
| *B32B 27/12* | (2006.01) |
| *B29C 53/04* | (2006.01) |
| *B29C 65/02* | (2006.01) |
| *B29K 33/00* | (2006.01) |

(52) U.S. Cl.
CPC ............ *B32B 7/12* (2013.01); *B32B 27/10* (2013.01); *B32B 27/12* (2013.01); *B32B 27/36* (2013.01); *B32B 29/002* (2013.01); *B32B 29/02* (2013.01); *B29K 2033/00* (2013.01); *B29K 2201/08* (2013.01); *B32B 2250/02* (2013.01); *B32B 2255/12* (2013.01); *B32B 2255/26* (2013.01); *B32B 2262/0276* (2013.01); *B32B 2262/062* (2013.01); *B32B 2307/7163* (2013.01); *B32B 2307/7265* (2013.01); *B32B 2439/02* (2013.01); *B32B 2439/70* (2013.01); *Y10T 156/1051* (2015.01); *Y10T 442/637* (2015.04); *Y10T 442/693* (2015.04)

(58) Field of Classification Search
USPC .................................................. 442/361, 412
See application file for complete search history.

(56) References Cited

U.S. PATENT DOCUMENTS

| | | | | |
|---|---|---|---|---|
| 5,679,421 | A * | 10/1997 | Brinton, Jr. ............. | B32B 27/28 383/1 |
| 5,702,826 | A * | 12/1997 | Ehret ...................... | B32B 27/02 428/515 |
| 5,981,694 | A * | 11/1999 | Gruber .................... | A61L 15/26 428/486 |
| 2003/0031388 | A1* | 2/2003 | Gipson ................... | B32B 27/12 383/64 |
| 2010/0193578 | A1* | 8/2010 | Sanders .................. | B31B 43/00 229/120 |

FOREIGN PATENT DOCUMENTS

| | | |
|---|---|---|
| JP | 2002-291351 | 10/2002 |
| JP | 2003-165181 | 6/2003 |
| RU | 2 198 792 | 3/2002 |

OTHER PUBLICATIONS

Written Opinion of the International Searching Authority for PCT/FI2013/050501, dated Sep. 25, 2013.
Decision to Grant, RU Application No. 2014151476/05(082482) (Feb. 12, 2016).

* cited by examiner

MULTILAYER ARTICLE COMPRISING A BIODEGRADABLE POLYMER-BASED LAYER AND A CELLULOSE-FIBER BASED SUPPORT; METHOD OF MANUFACTURING MULTILAYER ARTICLE AND FOOD ACCESSORY COMPRISING A MULTILAYER ARTICLE

This application is the U.S. national phase of International Application No. PCT/FI2013/050501, filed on May 7, 2013, which designated the U.S. and claims priority to FR Application No. 1255034, filed May 31, 2012, the entire contents of each of which are hereby incorporated by reference.

TECHNICAL FIELD

The invention relates to a multilayer article comprising a biodegradable polymer-based layer. The field of use of the present invention relates to the agri-food industry and in particular to the manufacturing of food molds resistant to damp conditions after use.

BACKGROUND ART

The molds for food products known in the prior art conventionally comprise aluminum foil which gives certain rigidity to the mold whether the conditions are dry or damp. However, this type of mold is not biodegradable.

Additionally, because of the presence of aluminum, such molds cannot be used in microwave ovens and they are not suitable for use in production lines which include metal detectors.

In order to solve these problems, paper-based molds were developed. Although the resistance of such paper-based molds to the required cooking temperature of food products is satisfactory, such molds have the disadvantage of losing their initial shape in the presence of moisture. In fact, conservation period of a food product in air-tight container, in some cases with modified atmosphere and at fridge temperatures moisture coming from the food products diffuses into the paper of the mold and thus causes the rims thereof to sag.

It is known as such to improve such paper-based molds by incorporating an outer layer of plastic on the paper-based layer, such as polyethylene terephthalate (PET). A shortcoming of using PET is that PET is not biodegradable and cannot be composted.

In publication GB 2443810A there is shown a packaging material comprises a compostable substrate, such as paperboard, provided with a surface film, also of compostable material, on an external surface of the substrate. The surface film may be cellophane, polylactic acid, polyhydroxybutyric acid or polyhydroxylvaleric acid amongst numerous others mentioned. Lamination may be by means of a compostable adhesive. This kind of a structure where the substrate is provided with a film of compostable material has a shortcoming that typically such a film is substantially incompressible and poorly stretchable, which makes it difficult process in converting process.

It is an object of the invention to provide a multilayer article, a behavior of which as a food accessory and/or mold of a food product is considerably improved. It is also an object of the invention to provide a method of manufacturing a multilayer article, by means of which a food accessory and/or a mold of a food product may be produced with good usability.

DISCLOSURE OF THE INVENTION

In the context of the specification following definitions apply. Compostability is generally defined in the standards EN 13 432, ISO 14855 and/or US ASTM D 6868. The expression "compostable" when applied to a material or a product means that the material, or the entire product, will both biodegrade and disintegrate. By "biodegrade" is meant that the chemical structure of the material breaks down under the action of micro-organisms, while by "disintegrates" is meant that the material, or the product made from it, will physically fall apart into fine visually indistinguishable fragments, at the end of a typical composting cycle. In order to be considered a compostable polymer material, the polymer chains must break down under the action of the micro-organisms, so that total mineralization is achieved (i.e. conversion of the material into $CO_2$, water, inorganic compounds and biomass under aerobic conditions) at a high rate compatible with the normal composting process of vegetable waste.

The term "food-safe adhesive" is understood to mean any type of adhesive generally used in the agri-food industry. However, advantageously, it can be chosen among the group comprising acrylic adhesives, polyurethane adhesives, vinyl ethylene acetate and mixtures thereof. For example, the food-safe adhesive may be ethylene vinyl acetate sold by Celanese under the name Vinamul 3231. Advantageously, the food-safe adhesive can satisfy the FDA 176.170, FDA 176.180 and BfR XIV regulatory standards. In any case, generally, any adhesive having an approval for use in contact with hot food (around 220° C.) is likely to be suitable in the context of the present invention.

Object of the invention is met by a multilayer article comprising successively a non-woven layer of fibers comprising at least 50% by weight of at least one biodegradable polymer melting point of which is below 220° C., a layer of food-safe adhesive and a cellulose-fiber based support.

This kind of a multilayer article has an effect on its behavior as food accessory and/or a mold of a food product that its shape is remains in the presence of moisture. Additionally the stiffness of non-woven material, as a key property, improves the rigidity of the food article according to the invention.

The rigidity of the article according to the invention is provided particularly by the nonwoven once heated above its melting point, melted and cooled/solidified, which keeps the shape of the article in its form. This applies especially folded areas and corners.

Also when used to form a food accessory, particularly a mold, having bended edges forming a rim of the accessory, the multilayer article according to the invention provides excellent behavior and usability in the converting process comprising folding of the edge thereof. This is accomplished at least partly by the fibers in the non-woven layer of fibers. The non-woven layer of fibers may be called herein also as non-woven fabric.

It is envisaged that compostable polymers usable in the manufacture of a food accessory in accordance with the present invention will be so-called biopolymers, for example non-oil-based polymers. Such polymers may be plant-based, for example cellulose-based, or they may be produced by fermentation processes, for example by the fermentation of sugars.

The thickness of the multilayer article according to the invention is advantageously between 100 and 250 micrometers, whereas the non-woven fabric comprising biodegradable polymer(s) fibers generally has a thickness between 75 and 150 micrometers. Furthermore, the non-woven fabric advantageously weighs between 5 and 100 g/m2, more advantageously between 10 and 30 g/m2 and still more advantageously between 15 and 20 g/m2.

The biodegradable polymer having its melting point below 220° C. can advantageously be selected among the group comprising polylactic acid (PLA), PHA (polyhydroxyalkanoate), PHB (poly(hydroxybutyrate)), PHB(V) (poly(hydroxybutyrate-co-hydroxyvalerate)), PBS (poly(butylenesuccinate)), biopolyesters and mixtures thereof.

The biodegradable polymer is advantageously polylactic acid (PLA) which has the advantage of being in particular biosourced, biodegradable and can be composted. PLA is understood to be polylactic acid, derivatives thereof (L and D type or copolymers), and mixtures thereof.

The expression "cellulose-fiber based support", or cellulose support, designates a support comprising cellulose fibers, refined more or less according to desired properties (density, transparency, mechanical properties). The cellulose-fiber based support comprises cellulose fibers 80-100% by weight.

According to an embodiment of the invention the remaining portion of the cellulose support may be constituted of synthetic fibers of, for example, polyester and/or artificial fibers (for example viscose, cellulose acetate) and/or natural fibers (for example cotton, linen, wood pulp) and/or mineral loads such as talc, kaolin, CaCO3, etc.

However, the cellulose support is advantageously constituted of biodegradable materials and is compostable.

According to an embodiment of the invention the cellulose support comprises a laminate structure of successive kraft paper layer and vegetable parchment layers. The combined effect of the cellulose support of kraft paper and vegetable parchment provides good thermoformability, shape stability mainly provided by the kraft paper and good release properties and grease proof properties as well as wet strength mainly provided by vegetable parchment.

According to a specific embodiment of the invention the multilayer article consist in successive order of a non-woven layer of fibers comprising at least 50% by weight of at least one biodegradable polymer the melting point of which is below 220° C., an adhesive layer, a kraft paper layer, another adhesive layer and a vegetable parchment layer. In this embodiment the non-woven layer of fibers comprises advantageously 100% of PLA non-woven.

In general, a non-woven fabric is obtained by random arrangement of individual fibers which are interlaced. The cohesion of the fibers with each other can be assured by addition of adhesive or binders (latex, polyvinyl alcohol, starch etc.), by heating, by pressure or by stitching for example.

Various processes for forming non-woven fabrics are part of the knowledge of the person skilled in the art. They include for example the processes of spreading by melting/blowing ("meltblowing"), threading by direct or by melting route ("spin laying", "spunbond"), carding, dispersion by a jet of air ("air laying"), or dispersion by a jet of water ("water laying").

However, according to an advantageous embodiment of the invention, the cohesion of the fibers in the non-woven fabric is advantageously obtained in the absence of adhesive or binder by thermal binding (hot calendaring).

The non-woven fabric comprising at least one biodegradable polymer can be multilayer. Advantageously, the biodegradable-polymer based non-woven fabric layer is a monoply, two ply or three ply non-woven.

According to an embodiment of the invention the non-woven layer of fibers comprises 50-100% by weight of at least one biodegradable polymer. According to a specific embodiment, the non-woven fabric can comprise at least 85%, more preferably at least 90%, and still more preferably 100% by weight of biodegradable-polymer fibers. The non-woven layer comprising a biodegradable polymer brings about an advantage of being in particular biosourced i.e. originating from natural sources and eventually being able to be composted.

The biodegradable polymer-fiber based non-woven fabric is preferably obtained by melting ("spunbond"), especially when it comprises PLA fibers.

According to an embodiment of the invention the non-woven layer of fibers comprises 50-100% by weight of PLA fibres and the remaining portion of the layer consists of cellulosic fibers. In this embodiment the non-woven is preferably obtained be air or wet laying formation.

Other than the biodegradable polymer fibers, the non-woven layer of fibers can also include additives and minerals, but also fibers of at least one biosourced polymer which could be biodegradable. It can in particular involve cellulose fibers.

The melting point of the non-woven layer of fibers can be modulated by the incorporation of additives or fibers other than that of the biodegradable polymer.

With a food-safe adhesive it is in particular possible to assure the cohesion of the multilayer article when it is exposed to a temperature close to or above the melting point of the biodegradable polymer-fiber containing layer of non-woven fabric. The adhesive makes it possible to keep the non-woven fabric on the cellulose-fiber based support when the multilayer article is subject to temperatures near or over the melting point of the biodegradable polymer.

The multilayer article according to the invention is advantageously totally biodegradable. According to this specific embodiment, the at least one biodegradable polymer is advantageously polylactic acid (PLA).

When only two layers are bonded together by the adhesive, the quantity of adhesive represents between 8 and 10 g/m2, and still more advantageously between 3 and 5 g/m2 relative to the surface of the multilayer article.

The layer of food-safe adhesive can be a continuous film of adhesive uniformly distributed between the biodegradable polymer-based layer and the cellulose support. It can also involve discontinuous distribution, such as dots or stripes of adhesive. The layer of food-safe adhesive can also include grid-like distribution As far as the cellulose-fiber based support is concerned, it can be a support which has fat and/or moisture barrier properties. According to an embodiment of the invention it can in particular be selected among the group comprising:
  parchment papers, high density greaseproof papers and chemically treated greaseproof papers (for example with a fluorinated resin);
  papers referred to as "release papers" such as papers silicone treated on at least one side, papers of which at least one surface was coated with a layer referred to as "release" (for examples papers treated with Quilon chrome articles); parchment paper.

When the desired properties of the cellulose-fiber based support involve moisture resistance but not necessarily grease-barrier and release properties, it can also be chosen among the group comprising:
  non-greaseproof papers;
  non-release papers;

sized papers whose treatment serves to slow water penetration;

The cellulose-fiber based support advantageously provides a functional barrier to the possible migration of the adhesive.

According to another specific embodiment, the multilayer article according to the invention can include an additional protective layer covering the non-woven layer of fibers. This protective layer is applied on the surface of the non-woven fabric opposite the surface in contact with the cellulose-fiber based support via the layer of food-safe adhesive.

This protective layer can be based on any material safe for contact with hot food and melting point of which is over 220° C. It can also involve a layer of the same type as the cellulose-fiber based support from the multilayer article.

The protective layer serves to isolate the biodegradable polymer-based layer within the multilayer article which thus includes successively:
- a cellulose-fiber based support;
- a layer of food-safe adhesive;
- a non-woven fabric consisting of at least one biodegradable polymer melting point of which is below 220° C.;
- a layer of food-safe adhesive;
- a protective layer.

In some cases, the protective layer can also comprise or be constituted of nonbiodegradable materials such as polyethylene terephthalate, PET. However, if biodegradability is desired the protective layer will not contain polyethylene terephthalate fibers.

Object of the invention is also met by a method of manufacturing of the multilayer article described above. This method includes the following steps:
applying a food-safe adhesive on the cellulose-fiber based support;
applying a layer comprising at least 50% by weight of biodegradable polymer fibers on the cellulose-fiber based support on the side of the applied adhesive,
drying of the resulting multilayer article.

Advantageously the non-woven layer comprising at least 50% by weight of biodegradable polymer fibers and the cellulose-fiber based support are joined by pressing them together e.g. by running them through a press device. Drying of the resulting multilayer article is accomplished with hot air or cylinder drier.

The application of food-safe adhesive, or gluing, can be done on the entirety of the surface of the cellulose-fiber based support or by meshed coating in order to maintain the water vapor permeability of the cellulose support during cooking. The quantity and the nature of the layer of food-safe adhesive can be adjusted according to the intended final application.

The invention also relates to the use of the multilayer article described above, especially in the agri-food industry. In this case, the side of the multilayer article in contact with the food product is the cellulose-fiber based support.

The invention also relates to a food accessory constituted from said multilayer article. Advantageously the food accessory is provided with a substantially flat bottom and edge areas turned or raised from the plane of the flat bottom. In this context the term flat means generally that the bottom is plain so that it may be provided e.g. with local embossed areas. The raised rim may be provided by pleating, in which cases the edges include pleats. The food accessory advantageously has rolled rims on the periphery thereof.

When the accessory is provided with a substantially flat bottom and edge areas turned or raised from the plain of the flat bottom the side of the cellulose-fiber based support is inside the accessory.

Food accessory may also be a platter or plate such as a pie plate, especially a pie plate with flat edges which is not necessarily intended to be placed in an oven. In this case the article is heated above its melting point, melted and cooled/solidified, which keeps the shape of the article in its form. The step of heating is practiced prior to using the accessory for food deposit purposes.

A method for manufacture the food accessory, and more specifically for a mold, from a multilayer article comprising successively a layer comprises at least 50% by weight of at least one biodegradable polymer melting point of which is below 220° C.; a layer of food-safe adhesive; a cellulose-fiber based support; comprises arranging a piece of the multilayer article and shaping the multilayer article and folding the edges of the multilayer article.

Arranging a piece of the multilayer article comprises cutting out using conventional techniques which are part of the knowledge of the person skilled in the art.

The composition of the multilayer article can of course be adjusted according to the embodiments described above. For example, should the multilayer article comprise a protective layer, this protective layer serves to isolate the biodegradable polymer-based layer from the heating plates.

This protective layer is however not essential to the invention. In fact, the adhesive holds the biodegradable polymer-fiber based layer onto the cellulose support.

The process can also include a step of heating the object after forming and/or shaping. Through this heat treatment, the durability of the accessory during its use, especially in moist conditions, can be improved.

In fact, in order to confer to the properties of resistance of the accessory to atmospheric moisture before its use, the accessory can be thermally pretreated according to at least one of the following two embodiments.

In the first embodiment, the accessory is completely pretreated by going through an oven the temperature of which is greater than or equal to the melting point of the biodegradable polymer-based layer for a time advantageously of between 5 in 10 minutes.

In the second embodiment, the accessory is locally pretreated, in particular when the accessory comprises rolled edge rim. In this case, only the rolled portion of the edge is heated, for example by local hot pressing of the object, under the same temperature conditions as in the first embodiment. Ultrasonic bonding may also be used for the same purpose.

This pretreatment by complete or local heating of the accessory serves to melt the biodegradable polymer-based layer, especially in the area of the rolled edge and pleats which may be around the object. Thus, when the biodegradable polymer-based layer is in contact with itself, during cooling thereof a reinforcement of the structure of the accessory is formed. The biodegradable polymer, melted and then hardened, freezes the cellulose support according to its initial shaping. The shaping is therefore retained, advantageously in presence of moisture, especially under normal conditions of use of the object.

In fact, when the biodegradable polymer hardens, meaning when the temperature is below the melting point thereof, it serves to bind the pleat regions of the mold which therefore have a structure whose rigidity is improved compared to the initial structure before heating.

The role of the adhesive is in particular to keep the non-woven layer of fibers in place during formation of the accessory and during melting of the biodegradable polymer in an oven. During treatment of the accessory by heating or during its use at temperatures at which the non-woven layer of fibers melts, the biodegradable polymer does not flow; it is held to the cellulose-fiber based support by the food-safe adhesive.

Thus, the temperature of use of the accessory, especially when it involves a mold, can be higher than the melting point of the biodegradable polymer.

The optional steps for shaping the multilayer article according to the invention include thermoforming or embossing in particular.

According to a specific embodiment of the invention the cellulose based support may be constituted of a lamination of a kraft paper and a vegetable parchment. The vegetable parchment layer is advantageously 40-45 g/m2, and may be siliconized on one side, preferably the side coming in contact with the food.

The grammage of the kraft layer may be for example 40-150 g/m2 depending on the actual size and/or demands of end the use of the article. The non-woven layer comprising at least 50% by weight of at least one biodegradable polymer melting point of which is below 220° C., and the a layer of food-safe adhesive may be according to any other embodiment of the invention.

BRIEF DESCRIPTION OF DRAWINGS

In the following, the invention will be described with reference to the accompanying exemplary, schematic drawings, in which.

DETAILED DESCRIPTION OF DRAWINGS

Figure 1:
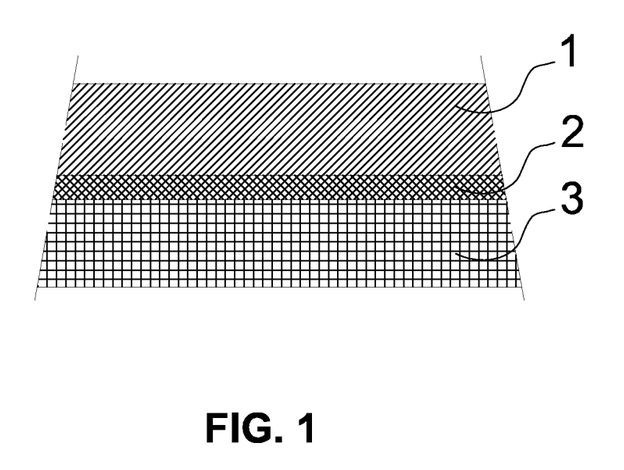
FIG. 1 illustrates the multilayer article according an embodiment to the invention.

A multilayer article is shown in FIG. 1 comprising successively:
- a cellulose-fiber based support 1;
- a layer of food-safe adhesive 2;
- a layer 3 comprising at least 50% by weight of a biodegradable polymer melting point of which is below 220° C., advantageously 100% by weight.

The multilayer article shown in the FIG. 1 is manufactured by practising at least the following steps:
- applying a food-safe adhesive on the cellulose-fiber based support;
- applying a layer comprising at least 50% by weight of at least one biodegradable polymer melting point of which is below 220° C. on the cellulose-fiber based support on the side of the applied adhesive, and
- drying of the resulting multilayer article.

Figure 2:
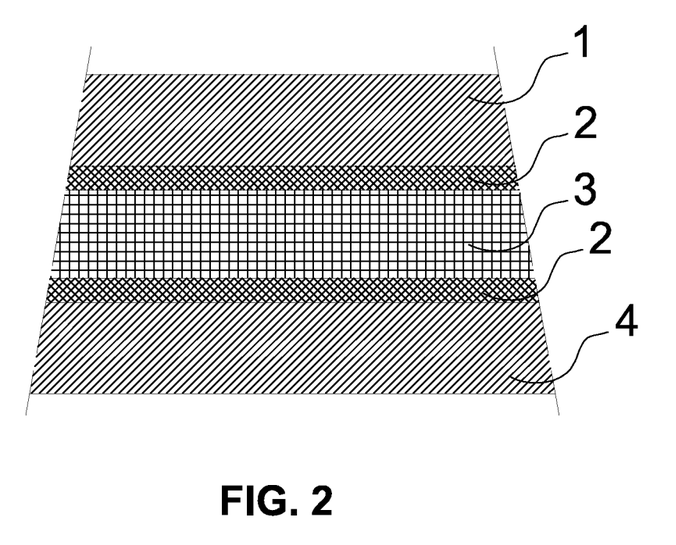
FIG. 2 shows the multilayer article according to another embodiment of the invention.

FIG. 2 shows a specific embodiment of a multilayer article according to the invention where a protective layer 4 covers the layer 3 which is a non-woven fabric of PLA.

This type of multilayer article comprises successively:
- a cellulose-fiber based support 1;
- a layer of food-safe adhesive 2;
- a non-woven fabric 3 comprising at least 50% by weight of polylactic acid (PLA) fibers, advantageously 100% by weight;
- a layer of food-safe adhesive 2;
- a protective layer 4.

Figure 3:
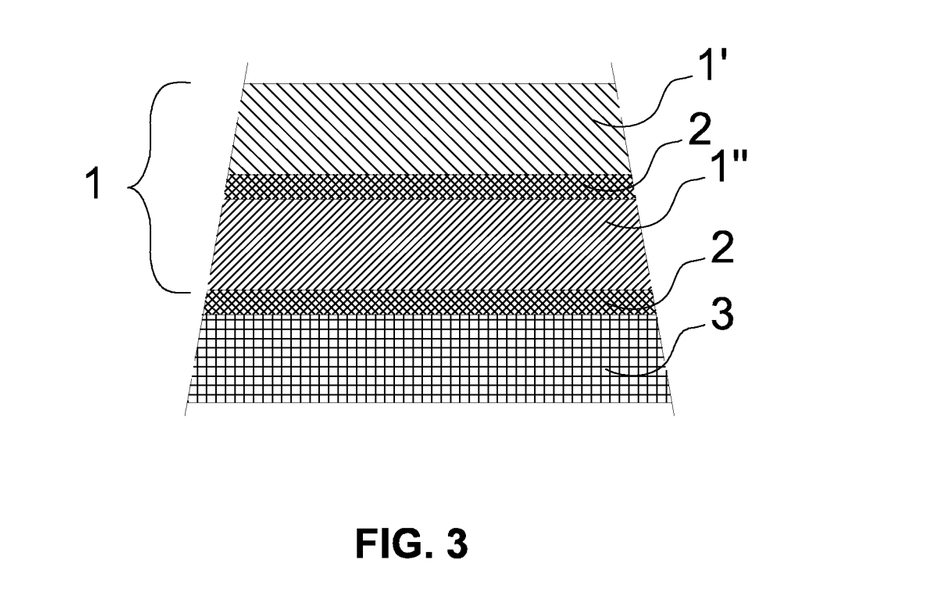
FIG. 3 shows the multilayer article according to another embodiment of the invention.

In FIG. 3 there is shown a multilayer article according to the invention where a specific layered structure of a cellulose-fiber based support 1 is provided. Namely, the cellulose-fiber based support 1 comprises successively a kraft paper layer 1", adhesive layer 2 and vegetable parchment layer 1' so that the kraft paper layer 1" is towards the non-woven fabric 3. The non-woven layer of fibers comprises advantageously 100% of PLA non-woven.

Figure 4:
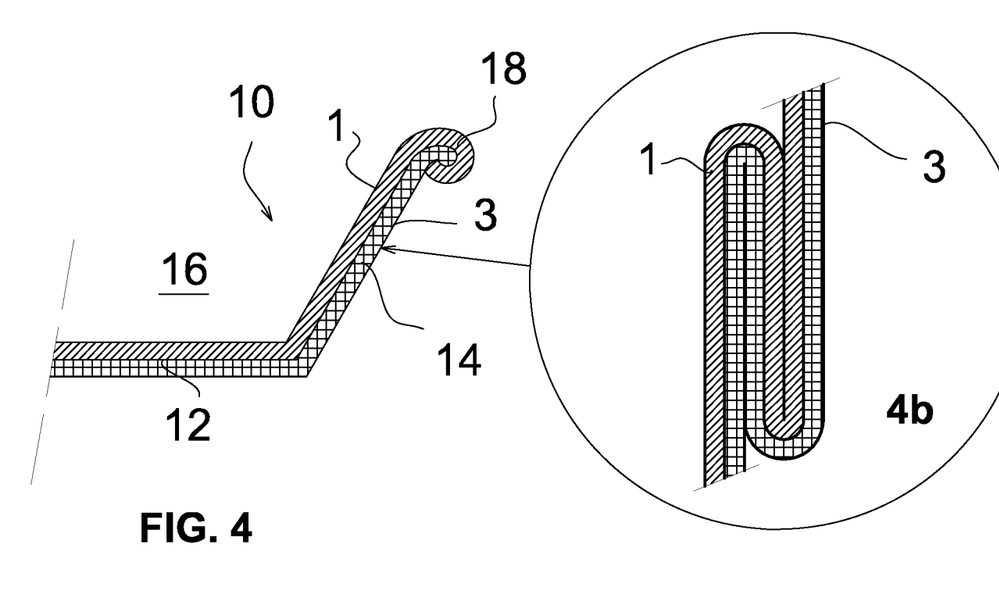
FIG. 4 shows a food product made of the multilayer article according to an embodiment of the invention.

In FIG. 4 there is shown a partial view a food accessory 10 in extremely schematic manner, which comprise a multilayer article shown in FIG. 1. The food accessory is here in the form of a mold, such as a baking mold. It has a generally a flat bottom 12 and a rim 14 arranged to circumscribe the bottom. The rim has been provided by turning the edge area from the plane of the bottom so that an inside 16 of the accessory is formed. As can be seen in the FIG. 4 the cellulose-fiber based support 1 is arranged towards inside of the food accessory. The raised rim 14 may be provided by pleating, in which cases the edges include pleats as depicted in section 4b showing a partial cross sectional view of the rim at a location of one pleat. The food accessory advantageously has rolled rims 18 on the periphery thereof. The mold form is selected suitably according to the need and may be similar in shape to those used in the agri-food industry and especially in the preparation of quiches. Advantageously it has a circular shape. Advantageously the food accessory is a mold. The food accessory is manufactured advantageously so that piece of the multilayer article as shown in FIG. 1 is provided and shaped according to requirements of the case and the edges of the multilayer article are folded to form the rim 18. The accessory may be heated in order to increase and/or strengthen the bonds of the non-woven layer of fibers 3. During the heating the at least one biodegradable polymer in the non-woven fabric 3 melts and adheres to surfaces being in contact with it making the food accessory more rigid.

In case the heating is not done during the process of manufacturing the food accessory, which may be the for example when the food accessory is a baking mold, the mold is heated in an oven during the baking and the above mentioned melting biodegradable polymer in the non-woven fabric 3 takes place during baking and solidifying after the baking, which makes the food accessory rigid as well.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such a combination is technically feasible.

the invention claimed is:

1. A thermoformably shapeable multilayer article for a food product comprising:
   (i) a non-woven fiber layer comprising at least 50% by weight of fibers formed of at least one biodegradable polymer which comprises polylactic acid (PLA) having a melting point which is below 220° C., a thickness between 75 and 150 micrometers and a weight between 10 and 30 g/m$^2$;
   (ii) a cellulose-fiber based support layer which comprises a greaseproof paper; and (iii) an adhesive layer comprised of a food-safe adhesive selected from the group consisting of acrylic adhesives, polyurethane adhesives and vinyl ethylene acetate, the adhesive layer adhesively joining the non-woven fiber layer to the cellulose fiber based support layer.

2. The multilayer article according to claim 1, wherein the at least one biodegradable polymer further comprises a polymer which is selected from the group consisting of PHA (polyhydroxyalkanoate), PHB (poly(hydroxybutyrate)), PHB(V) (poly(hydroxybutyrate-co-hydroxyvalerate)), PBS (poly(butylenesuccinate)), biopolyesters and mixtures thereof.

3. The multilayer article according to claim 1, wherein the cellulose-fiber based support comprises a laminated structure comprised of a kraft paper layer and a vegetable parchment layer.

4. The multilayer article according to claim 1, wherein the non-woven layer of fibers comprises 50-100% by weight of the at least one biodegradable polymer and a remaining portion of the non-woven layer of fibers comprises cellulosic fibers.

5. The multilayer article according to claim 1, which further comprises a protective layer covering the non-woven layer of fibers comprising the at least one biodegradable polymer.

6. The multilayer article according to claim 1, wherein the non-woven layer of fibers comprises 100% by weight of the at least one biodegradable polymer melting point of which is below 220° C.

7. The multilayer article according to claim 3, wherein the vegetable parchment layer has a grammage of 40-45 g/m$^2$ and the kraft paper has a grammage of 40-15 g/m$^2$.

8. The multilayer article according to claim 3, wherein the cellulose-fiber based support has a siliconized side which is positioned next to the vegetable parchment layer.

9. The multilayer article according to claim 1, wherein the non-woven fiber layer comprises a layer of thermally bound fibers.

10. The multilayer article according to claim 1, wherein the adhesive is present in the adhesive layer in an amount between 3 and 5 g/m$^2$ relative to the surface of the multilayer article.

11. The multilayer article according to claim 1, wherein the adhesive is present in the adhesive layer in an amount between 8 and 10 g/m$^2$ relative to the surface of the multilayer article.

12. The multilayer article according to claim 1, wherein the cellulose-fiber based support comprises a paper having at least one side which is treated with silicone.

13. The multilayer article according to claim 1, wherein the cellulose-fiber based support comprises a parchment layer.

14. The multilayer article according to claim 5, which comprises a protective layer having a melting point which is over 220° C.

15. A multilayer article for a food product comprising:
(i) a non-woven fiber layer of thermally bound fibers comprising at least 50% by weight of fibers formed of at least one biodegradable polymer which comprises polylactic acid (PLA) having a melting point which is below 220° C. and having a thickness between 75 and 150 micrometers and weight between 10 and 30 g/m$^2$;
(ii) a cellulose-fiber based support layer which comprises a parchment paper; and
(iii) an adhesive layer comprised of an adhesive selected from the group consisting of acrylic adhesives, polyurethane adhesives and vinyl ethylene acetate, the adhesive layer adhesively joining the non-woven fiber layer to the cellulose fiber based support layer.

16. The multilayer article according to claim 15, wherein the at least one biodegradable polymer further comprises a polymer which is selected from the group consisting of PHA (polyhydroxyalkanoate), PHB (poly(hydroxybutyrate)), PHB(V) (poly(hydroxybutyrate-co-hydroxyvalerate)), PBS (poly(butylenesuccinate)), biopolyesters and mixtures thereof.

17. The multilayer article according to claim 15, wherein the cellulose-fiber based support comprises a laminated structure comprised of a kraft paper layer and a vegetable parchment layer.

18. The multilayer article according to claim 15, wherein the non-woven layer of fibers comprises 50-100% by weight of the at least one biodegradable polymer and a remaining portion of the non-woven layer of fibers comprises cellulosic fibers.

19. The multilayer article according to claim 15, which further comprises a protective layer covering the non-woven layer of fibers comprising the at least one biodegradable polymer.

20. The multilayer article according to claim 15, wherein the non-woven layer of fibers comprises 100% by weight of the at least one biodegradable polymer melting point of which is below 220° C.

21. The multilayer article according to claim 17, wherein the vegetable parchment layer has a grammage of 40-45 g/m$^2$ and the kraft paper has a grammage of 40-15 g/m$^2$.

22. The multilayer article according to claim 17, wherein the cellulose-fiber based support has a siliconized side which is positioned next to the vegetable parchment layer.

23. The multilayer article according to claim 15, wherein the non-woven fiber layer comprises a layer of thermally bound fibers.

24. The multilayer article according to claim 15, wherein the adhesive is present in the adhesive layer in an amount between 3 and 5 g/m$^2$ relative to the surface of the multilayer article.

25. The multilayer article according to claim 15, wherein the adhesive is present in the adhesive layer in an amount between 8 and 10 g/m$^2$ relative to the surface of the multilayer article.

26. The multilayer article according to claim 15, wherein the cellulose-fiber based support comprises a paper having at least one side which is treated with silicone.

27. The multilayer article according to claim 15, wherein the cellulose-fiber based support comprises a parchment layer.

28. The multilayer article according to claim 19, which comprises a protective layer having a melting point which is over 220° C.

29. A method of manufacturing the multilayer article for a food product according to claim 1, comprising the following steps:
(a) applying the food-safe adhesive onto the cellulose-fiber based support comprising a grease proof paper;
(b) applying the non-woven layer onto the cellulose-fiber based support on a side of the applied adhesive; and
(c) drying of the resulting multilayer article.

30. A food accessory comprising the multilayer article according to claim 1, the food accessory comprising a flat bottom and a rim arranged by turning an edge area forming an inside of the accessory.

31. The food accessory according to claim 30, wherein the cellulose-fiber based support is arranged towards an inside of the food accessory.

32. A process for manufacturing the food accessory according to claim 30, comprising the steps of arranging a piece of the multilayer article, shaping the multilayer article and folding the edges of the multilayer article.

33. The process according to claim 32, wherein the process further comprises a step of heating the article after the step of shaping such that during the heating the at least one biodegradable polymer in the non-woven layer of fibers melts and adheres to surfaces in contact therewith.

* * * * *